R. H. BLACKALL.
RATCHET BRAKE MECHANISM.
APPLICATION FILED APR. 28, 1915.
1,167,258.
Patented Jan. 4, 1916.
2 SHEETS—SHEET 1.
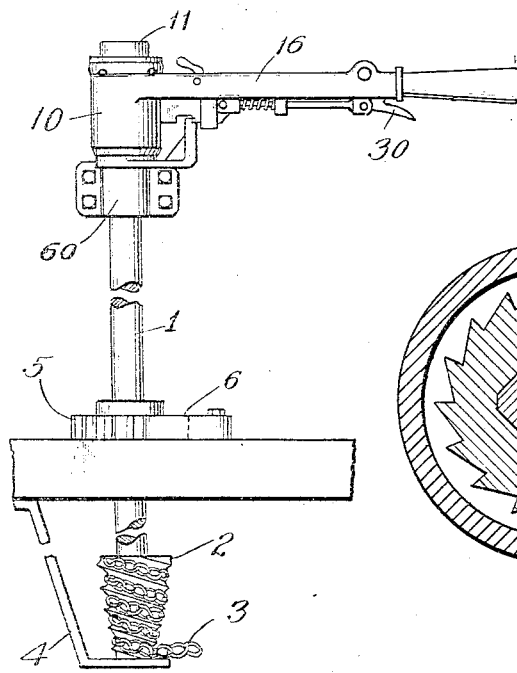
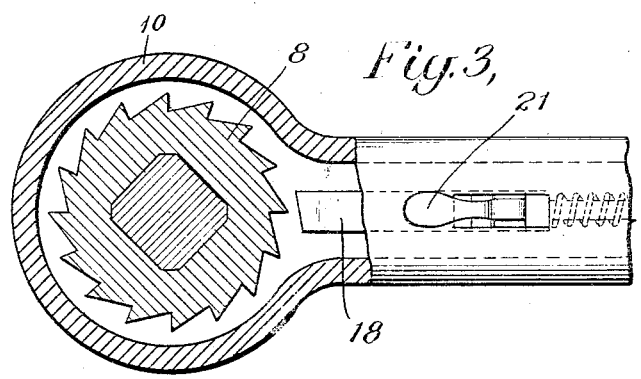
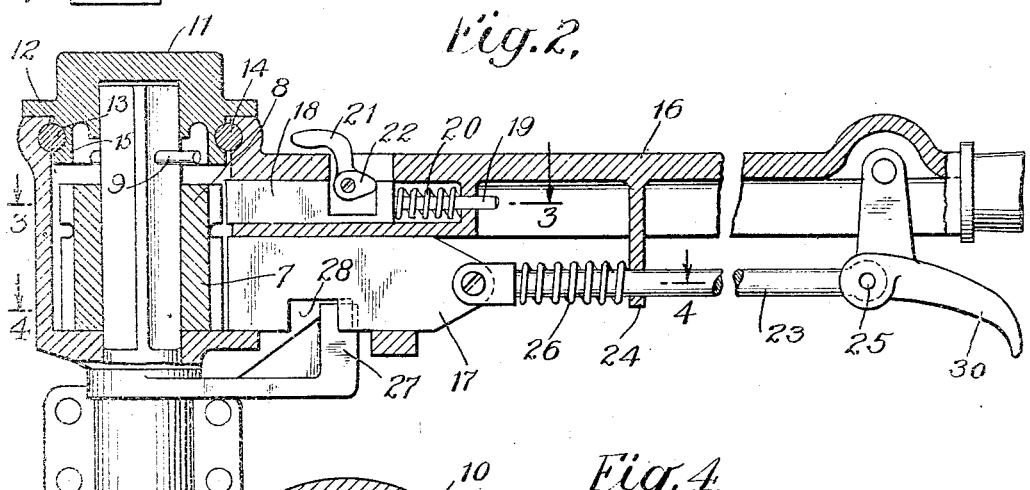
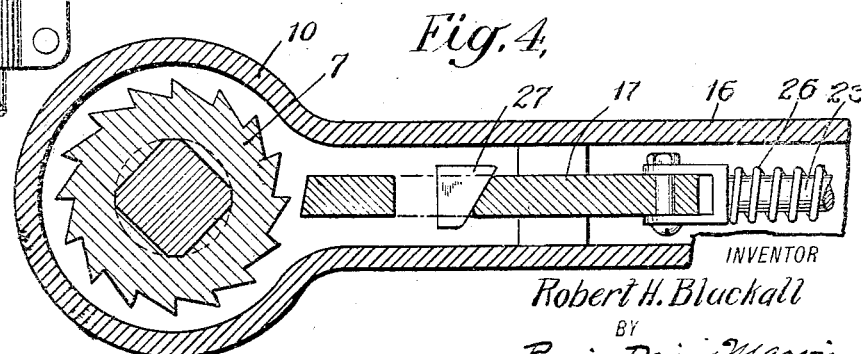
INVENTOR
Robert H. Blackall
BY
Pennie Davis & Marvin
ATTORNEYS

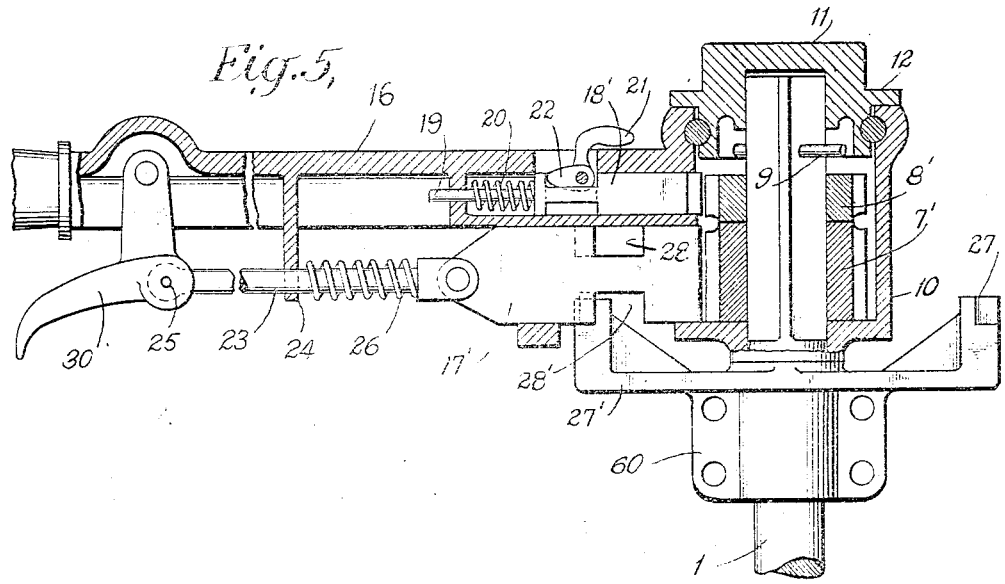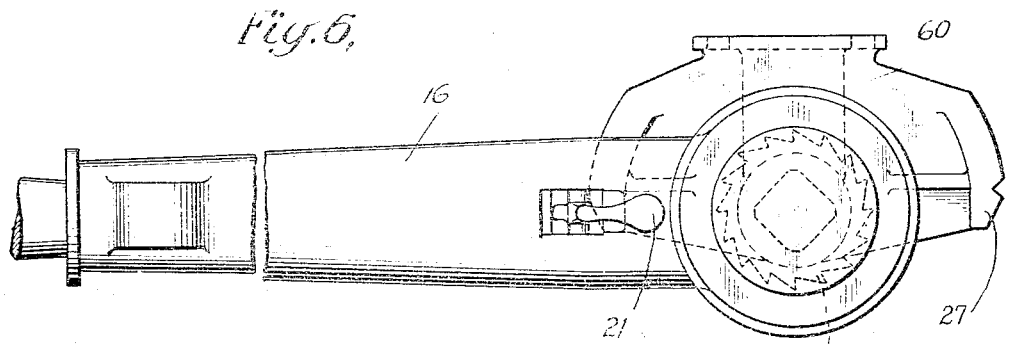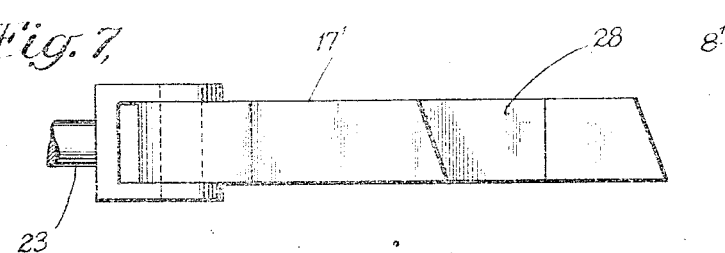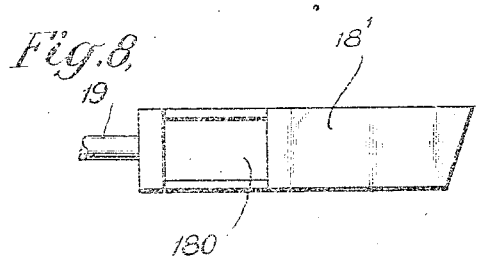

UNITED STATES PATENT OFFICE.

ROBERT H. BLACKALL, OF PITTSBURGH, PENNSYLVANIA, ASSIGNOR TO RATCHET BRAKE COMPANY, OF NEW YORK, N. Y., A CORPORATION OF DELAWARE.

RATCHET-BRAKE MECHANISM.

1,167,258. Specification of Letters Patent. Patented Jan. 4, 1916.

Application filed April 28, 1915. Serial No. 24,404.

*To all whom it may concern:*

Be it known that I, ROBERT H. BLACKALL, a citizen of the United States, residing in Pittsburgh, county of Allegheny, and State of Pennsylvania, have invented certain new and useful Improvements in Ratchet-Brake Mechanism; and I do hereby declare the following to be a full, clear, and exact description of the invention, such as will enable others skilled in the art to which it appertains to make and use the same.

The present invention relates to ratchet brakes for use on railway cars, street cars, and the like, where a chain, or its equivalent, connected with the brake rigging of the car, is to be wound about a brake staff or shaft to set the brakes on the car.

It has been found in practice that when a brake chain is wound about a brake staff to set the brakes, the turns of the chain on the staff sometimes become wedged or entangled one in another, or against the brake staff support or other parts of the car, so that when the brake staff is released to release the brakes, the chain will not freely unwind from the staff and the brake shoes will remain in contact with the wheels, thus leaving the brakes set or dragging, although the staff has been completely freed. It is, therefore, of importance to have means for rotating the staff backward to positively unwind the chain in such an emergency. One such means is disclosed in United States patent to Fralich, No. 1,066,594, issued July 8, 1913.

It is the object of the present invention to provide improved means for backing off the brake staff to positively unwind the chain, this back-off means being of such type that it is applicable to a wide class of ratchet brake mechanisms, and readily used in conjunction therewith, and having such characteristics that it is particularly advantageous when used in ratchet brakes of the so-called Lindstrom type, examples of which are disclosed in patents to Charles A. Lindstrom, No. 574,549, issued January 5, 1897, and No. 578,573, issued March 9, 1897, although it is to be understood that certain features of the present invention may be used successfully with ratchet brake elements differing radically in construction from those disclosed in the patents above mentioned.

In accordance with the present invention, means are provided for ratcheting the brake staff forward to set the brakes, and another and separate means to rotate the staff backward to back off the brake staff and positively unwind the brake chain.

In the preferred embodiment, the means for backing off the brake staff is in the form of ratchet mechanism, so that the staff can be ratcheted backward as well as forward, and with little loss of time in changing from one direction of rotation to the other. To effect this result, I prefer to use two ratchets on the brake staff, one right-handed and one left-handed, and two separate and independent pawls movable with the brake applying lever, one of said pawls being adapted for action when the staff is to be rotated forwardly and the other pawl being brought into action only when the staff is to be backed off. These pawls may be of the spring pressed type and are provided with accessories whereby either may be held out of action while the other is in operation. One of them may also be adapted for automatic release, when the brake applying lever is swung back to its initial or normal position, in accordance with principles now common in the so-called Lindstrom ratchet brakes.

The details of my present invention, together with further objects and advantages, will become clear from the following detailed description, which is to be taken in conjunction with the accompanying drawings, wherein—

Figure 1 is an elevation, somewhat diagrammatic, of a brake staff equipped in accordance with my invention; Fig. 2 is a sectional elevation through the brake applying lever and its housing; Fig. 3 is a horizontal section on line 3—3 of Fig. 2; Fig. 4 is a horizontal section on line 4—4 of Fig. 2; Fig. 5 is a sectional elevation of a modification wherein the pawls and ratchets are reversible to convert the device from a right-handed to a left-handed ratchet brake; Fig. 6 is a plan view of the same; Fig. 7 is a plan of the main or lower pawl; and Fig. 8 is a plan of the upper or back-off pawl.

In the embodiment illustrated in Figs. 1 to 4 inclusive, the brake staff 1 is provided near its bottom with a winding drum 2, which may be of the approved conical form, and about which the brake chain 3 is wound when the brakes are to be applied. Bracket 4 is intended to represent diagrammatically any suitable support for the lower end of the brake staff. The staff is equipped with the usual holding ratchet 5 and foot pawl 6, located on the platform of the car, or otherwise accessible for hand or foot operation.

Near the top of the brake staff, and serving as a bearing therefor, is a support 60, which may be of any approved design, and secured to the vestibule or end of a car, or to the hand rail or other fixture of a car structure in accordance with common practice. The top of brake staff 1 is preferably made square or of irregular cross-section, and carries a pair of ratchets 7 and 8, one right-handed and the other left-handed, and preferably made integral, as shown in Fig. 2. With advantage, the upper ratchet 8 may have teeth of less width than those of the lower ratchet, because the strains to be applied thereto are less. Various means may be utilized for securing the ratchets to the brake staff, but by using a squared shaft with a transverse pin 9, the results are satisfactory. Inclosing the ratchets and mounted to rotate about the brake staff is a housing 10, positioned above support 60, and surmounted by a cap 11, which may inclose the top of the brake staff and may have an outwardly extending flange 12 overlapping the top of the housing to prevent water from getting inside. Preferably, cap 11 is secured to housing 10 by transverse pins or rivets 13 and 14, which pass through the housing and pass through grooves cut in the depending skirt 15 of the cap.

Secured to housing 10 in suitable manner, as by being made integral therewith, is an operating lever or handle 16, whereby the brake staff is to be rotated to set the brakes, or is to be backed off to positively unwind the brake chain. The housing and the inner end of the operating lever 16 are arranged to form guideways for a pair of pawls 17 and 18, the former of which is adapted for engagement with ratchet 7 and is the main or brake applying pawl, and the latter of which engages with ratchet 8, and is the back-off or brake releasing pawl. Pawl 18 fits slidingly within a pocket cast in the inner end of handle 16, and is provided with an outwardly extending rod 19 passing through the wall of that pocket to serve as a guide, and encircled by a helical spring 20, whereby the pawl may be brought into yielding or spring pressed engagement with its ratchet. Within the slot cut in the inner part of handle 16, near the housing, is a pivoted handle 21, carrying a cam 22 fitted within a recess in sliding pawl 18 and swinging to hold said pawl retracted, as shown in Fig. 2, or to allow the pawl to come forward under the action of spring 20, when desired. Preferably, the pawl-engaging tip of cam 22 is above the pivotal center of the cam, so that with the handle in the position shown in Fig. 2, the pawl will be locked against forward movement.

The main sliding pawl 17 is connected with a pull bar 23, passed through a supporting web 24 under the operating handle and pivotally attached at 25 to a bent lever, having a thumb piece 30 positioned convenient to the hand grip of operating lever 16. The helical spring 26, encircling the pull bar 23, normally urges pawl 17 forward into engagement with its ratchet 7. A stop 27, provided with a beveled face and rigidly secured to support 60, is adapted to engage pawl 17 at slot 28, and by engagement with the beveled edge of said slot, automatically withdraws said pawl when the operating lever 16 is swung backward to its normal or inactive position, which ordinarily is against the vestibule of the car, or in such position that it will be out of the way.

The operation of the device is as follows: When the brakes are to be applied, the operating lever 16 is swung forward from its normal position, thereby freeing pawl 17 from the retracting lug 27 and allowing its spring 26 to force it into yielding engagement with its ratchet 7. Thereafter, the continued forward movement of lever 16 rotates brake staff 1 and winds the brake chain 3 about said staff on drum 2. The foot pawl 6 can be held against ratchet 5 and will hold the brake staff when the operating lever 16 has reached the end of its forward swing, and is to be swung backward to get a new grip on the staff ratchet. This operation may be repeated and the brake staff ratcheted forward until the brake chain is wound up to the desired amount. In most cases, satisfactory release of the brakes may be effected by first swinging the hand lever back to its normal position with pawl 17 cammed out of engagement with its ratchet, and then kicking off foot pawl 6 to free the brake staff and allow the brake beam springs to unwind the chain. Or, if desired, the foot pawl 6 may be released and the hand lever 16 allowed to swing back until pawl 17 strikes stop 27 and releases the brake staff. Or there may be a graduated release by allowing the operating handle to swing back almost to its normal position, then holding staff 1 with the foot pawl and with sliding pawl 17 held out of engagement with its ratchet, swinging the operating handle forward to get a new grip on the operating ratchet, and thus releasing the brake by easy stages. With any of these modes of release there is danger that the brake chain, through tangling of its turns on drum 2, or through wedging against bracket 4, or other parts of the car structure, will not unwind easily enough to completely release the brakes, and it is then that the auxiliary pawl 18 is brought into use. By swinging handle 21 upward, pawl 18 is urged by its spring 20 into engagement with ratchet 8, and thereafter the operator, by holding pawl 17 out of engagement, may freely ratchet the brake staff backward to positively unwind the chain. In effecting the desired result, it is sometimes advantageous to allow pawls 17 and 18 to be in engagement with their respective ratchets simultaneously, for this locks the operating handle 16 to the brake staff, and allows the staff to be swung through a limited angle backward and forward. This sometimes helps in untangling the chain, though it is to be understood that when the brake staff is to be ratcheted, either forward or backward, only one of the sliding spring pressed pawls can be in action.

In the modification illustrated in Figs. 5 to 8, inclusive, wherein corresponding parts are numbered as in Figs. 1 to 4, inclusive, the ratchets and pawls are made reversible so that the device can be used either right-handed or left-handed, as may be required for most advantageous mounting on the car. In this embodiment, the support 60 is provided with an additional releasing stop 27', and the main or lower pawl 17' is provided with upper and lower slots 28 and 28' so that when inverted, as shown in Fig. 5, the slot 28' will coöperate with stop 27' to cam the pawl out of engagement with its ratchet when the brake handle is in its normal or releasing position. The back-off pawl 18' of this modification is also reversible, and to permit of this has a vertical opening 180 therethrough (Fig. 8) so that it may receive the cam 22 of the pivoted handle 21 whether arranged for right-handed or left-handed operation. In this embodiment, the ratchets 7' and 8' are not made integral with one another but are separate, as shown in Fig. 5, so that each is capable of inversion to change from right to left-hand operation. Other details of this embodiment are essentially the same as those shown in Figs. 1 to 4, and the device has the added advantage of being readily convertible into a left-handed ratchet mechanism, if, as sometimes happens, the structural details of the car end or vestibule favor a left-hand installation. The operation of this embodiment, whether right-handed or left-handed, is essentially the same as that above set forth in connection with the right-handed arrangement of Figs. 1 to 4, inclusive.

I am aware that various changes may be made in the details and arrangement of the several elements, without departing from the spirit of my invention, as defined by the appended claims.

I claim:

1. The combination of a brake staff, a winding drum thereon, a brake chain to be wound on said drum, right and left hand ratchets secured to said staff, an operating lever, and sliding pawls carried by said lever for ratcheting said staff in either direction.

2. The combination of a brake staff, a brake chain to be wound thereon, right and left hand ratchets secured to said staff, an operating handle pivoted to swing about said staff, a pawl for said right-hand ratchet, a separate pawl for said left-hand ratchet, and means for holding each pawl inoperative while the other is in action.

3. The combination of a brake staff, a brake chain to be wound thereon, an operating lever mounted to swing about said staff, right and left hand ratchets carried by said brake staff, a pair of spring pressed pawls, one for each ratchet, carried by said operating lever, and a pivoted handle whereby one of said pawls may be held retracted and inactive while the other pawl is in operative engagement with its ratchet.

4. The combination of a brake staff, a brake chain to be wound thereon, an operating lever mounted to swing about said staff and carrying a pair of spring pressed sliding pawls, a right-hand ratchet secured to said staff for receiving one of said pawls and a left-hand ratchet secured to said staff for receiving the other pawl, means for holding one of said pawls out of engagement with its ratchet when the operating lever is to be swung forward to wind the brake chain about the brake staff, and means for holding the other pawl out of action when the brake chain fails to unwind on release of the brake staff and the staff is to be ratcheted in the reverse direction.

5. The combination with a brake staff, of a support therefor having a stop, right and left hand ratchets carried by said staff, a housing inclosing said ratchets, an operating handle secured to said housing, a pair of sliding pawls carried by said handle, one of said pawls being adapted to engage said stop for automatic retraction when said operating handle has been swung back to its initial position, and the other ratchet having means normally holding it retracted but allowing it 6. The combination of a brake staff, a brake chain to be wound thereon when the brakes are to be set, a holding ratchet and pawl for said brake staff, a housing at the top of said staff, right and left hand ratchets therein, an operating lever secured to said housing to rotate the same, sliding spring pressed pawls movable about said staff with said handle, one of said pawls being adapted to ratchet the brake staff forward, and the other being adapted to ratchet the brake staff backward.

7. The combination of a brake staff, a brake chain to be wound thereon when the brakes are to be set, an operating lever mountd to swing about said staff, ratchet means secured to said staff and a pair of sliding pawls mounted to swing with said lever and adapted to ratchet said staff in opposite directions; substantially as described.

8. The combination of a brake staff, a tapered winding drum thereon, a brake chain to be wound on said drum, ratchet means secured to the top of said staff, a housing inclosing said ratchet, a cap inclosing the end of said staff and secured to said housing, an operating lever secured to said housing and adapted to rotate the same about said staff, a sliding spring pressed pawl swinging with said handle and adapted to engage with said ratchet when said brake staff is to be rotated to wind the brake chain on its drum and set the brakes, a support for said staff having a lug thereon positioned to engage with said pawl to automatically retract the pawl when said operating lever is swung back to its initial position, means for manually retracting said pawl when desired, a second sliding spring pressed pawl carried by said operating lever, and a pivoted handle having a cam for holding said last named pawl out of action while the brakes are being set, but permitting said pawl to engage its ratchet when the brake staff is to be rotated backward to positively unwind the chain from its drum.

9. The combination of a brake staff, a winding drum thereon, a brake chain to be wound on said drum, separate right and left-hand ratchets secured to the top of said staff, said ratchets being reversible, an operating lever and means carried by said lever for ratcheting said staff in either direction, said means being reversible to adapt said lever to right or left-hand operation as desired.

10. The combination of a brake staff, a brake chain to be wound thereon, right and left-hand ratchets secured to said staff, said ratchets being separate and each capable of inversion to change from right to left-hand operation, an operating handle pivoted to swing about said staff, separate reversible pawls for said ratchets and means for holding each pawl inoperative while the other is in action.

11. The combination of a brake staff, a brake chain to be wound thereon, an operating lever mounted to swing about said staff, separate invertible ratchets carried by said brake staff, a pair of spring-pressed pawls one for each ratchet, said pawls being carried by said operating lever and capable of inversion to change from right to left-hand operation, and a pivoted handle whereby one of said pawls may be held retracted and inactive while the other pawl is in operative engagement with its ratchet.

12. The combination of a brake staff, a brake chain to be wound thereon, an operative lever mounted to swing about said staff and carrying a pair of spring-pressed sliding pawls, a right-hand ratchet secured to said staff for receiving one of said pawls, and a left-hand ratchet secured to said staff for receiving the other pawl, means for holding one of said pawls out of engagement with its ratchet when the operating lever is to be swung forward to wind the brake chain about the brake staff, and means for holding the other pawl out of action when the brake chain fails to unwind on release of the brake staff and the staff is to be ratcheted in reverse direction, said ratchets and pawls being reversible to adapt the mechanism to right or left-handed operation as desired.

13. The combination with a brake staff of a support therefor having a stop, right and left-hand ratchets carried by said staff, said ratchets being separate and each capable of inversion to change from right to left-handed operation, a housing inclosing said ratchets, an operating handle secured to said housing, a pair of sliding pawls carried by said handle, one of said pawls being engaged by said staff for automatic retraction when said operating handle has been swung back to its initial position, and the other ratchet having means normally holding it retracted but allowing it to come into engagement with its ratchet when the brake staff is rotated backward by hand, both of said pawls being reversible to change from right to left-handed operation as desired.

14. The combination with a brake staff of a support therefor, having a pair of stops, right and left-hand ratchets carried by said staff, said ratchets being capable of inversion to change from right to left-handed operation, a housing inclosing said ratchets, an operating handle secured to said housing, a pair of reversible sliding pawls carried by said handle, one of said pawls being adapted to engage a stop on said support for automatic retraction when said operating handle has been swung back either right or left-handed to its initial position, and the other ratchet having means normally holding it retracted but allowing it to come into engagement with its ratchet when the brake staff is to be rotated backward by hand.

15. The combination of a brake staff, a brake chain to be wound thereon when the brakes are to be set, a holding ratchet and pawl for said brake staff, a housing at the top of said staff, right and left-hand ratchets therein, an operating lever secured to said housing to rotate the same, sliding spring-pressed pawls movable about said staff with said handle, one of said pawls being adapted to ratchet the brake staff backward, said ratchets and pawls being reversible to change from right to left-handed operation; substantially as described.

16. The combination of a brake staff, a brake chain to be wound thereon when the brakes are to be set, a housing at the top of said staff, right and left-hand ratchets therein, an operating lever secured to said housing to rotate the same, pawls movable about said staff with said handle, said pawls being capable of simultaneous engagement with said ratchets to positively lock the operating lever to the staff so that the staff may be jerked back and forth when its chain is tangled or fails to unwind; substantially as described.

In testimony whereof I affix my signature.

ROBERT H. BLACKALL.